United States Patent
Cieslinski

(10) Patent No.: US 9,288,408 B2
(45) Date of Patent: Mar. 15, 2016

(54) PIXEL CORRECTION METHOD

(71) Applicant: Arnold & Richter Cine Technik GmbH & Co. Betriebs KG, Munich (DE)

(72) Inventor: Michael Cieslinski, Ottobrunn (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 0 days.

(21) Appl. No.: 14/276,189

(22) Filed: May 13, 2014

(65) Prior Publication Data

US 2014/0340546 A1 Nov. 20, 2014

(30) Foreign Application Priority Data

May 17, 2013 (DE) .......................... 10 2013 209 165

(51) Int. Cl.
*H04N 5/367* (2011.01)
*H04N 5/357* (2011.01)

(52) U.S. Cl.
CPC ............... *H04N 5/357* (2013.01); *H04N 5/367* (2013.01)

(58) Field of Classification Search
CPC ...... H04N 5/357; H04N 5/367; H04N 5/3675
See application file for complete search history.

(56) References Cited

U.S. PATENT DOCUMENTS

| | | | |
|---|---|---|---|
| 6,642,960 B1 | 11/2003 | Kohashi et al. | |
| 6,726,103 B1 | 4/2004 | Motta et al. | |
| 7,173,741 B1 | 2/2007 | Kindt et al. | |
| 7,460,688 B2 | 12/2008 | Stanback et al. | |
| 8,310,570 B1 | 11/2012 | Aldrich et al. | |
| 2002/0196354 A1* | 12/2002 | Chang et al. | 348/246 |
| 2004/0032516 A1 | 2/2004 | Kakarala | |
| 2004/0239782 A1* | 12/2004 | Equitz et al. | 348/246 |
| 2006/0012695 A1* | 1/2006 | Chang et al. | 348/246 |
| 2007/0091187 A1* | 4/2007 | Lin | 348/246 |

(Continued)

FOREIGN PATENT DOCUMENTS

| | | |
|---|---|---|
| EP | 2 445 192 A2 | 4/2012 |
| WO | 2012063265 A2 | 5/2012 |

OTHER PUBLICATIONS

Bellas, Nikolaos, Yanof, Arnold: An Image Processing Pipeline with Digital Compensation of Low Cost Optics for Mobile Telephony. 2006 IEEE International Conference on Multimedia and Expo, ICME 2006, Toronto, Jul. 9-12, 2006. Conference Proceedings, ISBN 1-4244-0366-7, pp. 1249-1252.

(Continued)

*Primary Examiner* — Nicholas Giles
(74) *Attorney, Agent, or Firm* — Dinsmore & Shohl LLP

(57) ABSTRACT

In a method for correcting defective pixels of an image sensor which has a plurality of pixels for generating respective exposure dependent pixel signals, a defect characteristic for each pixel is associated with the image sensor and comprises information at least on whether the pixel is unusable, is usable without limitations or corresponds to one of a plurality of predefined defect classes. The method comprises a determination being made after the generation of the pixel signals for each pixel, at least when the defect characteristic of the pixel does not correspond to an unusable pixel or to a pixel which can be used without limitations, in dependence on at least the associated defect class of the pixel and on pixel signals of a plurality of adjacent pixels, whether the generated pixel signal of the pixel should be corrected, with the generated pixel signal of the pixel being replaced with a replacement value if this is the case.

15 Claims, 1 Drawing Sheet

(56) References Cited

U.S. PATENT DOCUMENTS

| | | | |
|---|---|---|---|
| 2008/0056606 A1 | 3/2008 | Kilgore | |
| 2008/0239115 A1* | 10/2008 | Sugizaki | 348/246 |
| 2008/0278609 A1 | 11/2008 | Otsuki | |
| 2008/0298716 A1 | 12/2008 | Yamagata | |
| 2009/0016638 A1 | 1/2009 | Nagatsuma et al. | |
| 2009/0167907 A1 | 7/2009 | Utsugi | |
| 2009/0175553 A1 | 7/2009 | Utsugi | |
| 2010/0073526 A1 | 3/2010 | Watanabe et al. | |
| 2011/0032393 A1* | 2/2011 | Yamaguchi | 348/247 |
| 2011/0080505 A1 | 4/2011 | Ogino | |

OTHER PUBLICATIONS

Isoz, Wilhelm; Svensson, Thomas; Renhorn, Ingmar: Nonuniformity correction of infrared focal plane arrays. Proc. SPIE 5783, Infrared Technology and Applications XXXI, 949 (Jun. 3, 2005); doi: 10,1117/12.606691.

Lopez-Alonso, Jose Manuel; Alda, Javier; Bad pixel identification by means of principal components analysis. Optical Engineering, vol. 41, No. 9, Sep. 2002, pp. 2152-2157.

German Search Report dated Aug. 21, 2013 relating to DE 10 2013 209 165.6.

* cited by examiner

PIXEL CORRECTION METHOD

CROSS-REFERENCE TO RELATED APPLICATIONS

This application claims priority of German Patent Application DE102013209165.6 filed on May 17, 2013.

FIELD OF THE INVENTION

The invention relates to a method for correcting defective pixels of an image sensor which has a plurality of pixels for generating respective exposure dependent pixel signals, wherein a defect characteristic for each pixel is associated with the image sensor and comprises information at least on whether the pixel is unusable, is usable without limitations or corresponds to one of a plurality of predefined defect classes.

BACKGROUND OF THE INVENTION

Image sensors of the named kind are used, for example, in digital still cameras and moving image cameras (movie cameras) for taking single images or a sequence of moving images. The image signals of these images are composed of pixel signals which are generated by the pixels of the image sensor which are typically arranged in rows and columns. Due to quality fluctuations in the production of the image sensors, individual pixels can be defective. In this respect, any deviation of a pixel from a standard specification is called a defect which has the result that the pixel, and in particular pixel signals generated by the pixel, is/are unusable or can only be used with limitations. For example, with a conventional image sensor for a moving image camera typically having several millions of pixels, 20 pixels are unusable and 3000 pixels can be used with limitations, while the remaining pixels can be used without limitations.

Especially in the area of professional moving image cameras which are also used for cinema productions, the differences caused by defective pixels cannot be tolerated even with a relatively small number of defective pixels in comparison with the total number of pixels. For, on the one hand, even differences of individual pixels also have a disturbing effect in the postprocessing of the image signals formed from the pixel signals. On the other hand, in particular on a projection of the image signals onto large cinema screens, even differences of individual defective pixels can become visible. The yield is therefore disadvantageously small in the manufacture of image sensors for cameras having such a high quality requirement.

To the extent that it appears tolerable in an individual case for a relatively small number of defective pixels, the pixel signals of all pixels of an image sensors which are identified as defective are discarded and new pixel signals are estimated for the defective pixels by interpolation of pixel signals of adjacent pixels. In this respect, a respective estimated pixel signal should come as close as possible to a pixel signal which a pixel usable without limitation would have produced at this position so that where possible a disturbance can no longer be perceived in the image signal after the correction. Since in each case all the defective pixels are uniformly discarded, that is both unusable pixels and pixels which can be used with limitations, the number of pixel values which have to be calculated by interpolation is always the same, which causes a high correction effort. In addition, image information which may possibly be usable is discarded by the discarding of the pixel signals of pixels which can be used with limitations so that the image quality may be impaired to an unnecessary degree.

For a more differentiated correction, the pixels of an image sensor can be differentiated in accordance with a defect characteristic as to whether they are unusable, can be used without limitations or correspond to one or more predefined defect classes. Different degrees of limited usability of respective pixels can then be detected by these defect classes. The unusability and/or the unlimited usability of a pixel can in particular also be described as a respective such defect class. This categorization into defect classes makes it possible also to treat pixels with defects of different degrees differently. Pixels within the same defect class are in contrast still corrected uniformly.

However, in this procedure, the differences caused by defective pixels with respect to their degree and/or their perceptibility in the image signal are not necessarily constant. For example, the difference of a defective pixel can depend on the intensity of its lighting (light or dark). The amount by which a difference in the pixel signal of a defective signal can be perceived and which is thus in need of correction can in particular depend on the environment of the pixel, that is on the pixel signals of adjacent pixels. It is therefore not absolutely necessary in equal measure for all pixels of a defect class to correct them for an improvement of the image quality. Potential for a further reduction in the processing effort therefore remains unused when only one defect characteristic is considered. Furthermore, a correction itself always suffers from uncertainty. A correction which is only orientated on a defect class associated with the respective pixel can therefore at times even worsen the image quality.

SUMMARY OF THE INVENTION

It is an object of the invention to provide a method for correcting defective pixels which is efficient and which ensures that the correction of the defective pixels results in an improvement in the image quality.

The object is satisfied by a method having the features of claim 1 and in particular in that a determination is made for each pixel after the generation of the pixel signals, at least when the defect characteristic of the pixel does not correspond to an unusable pixel or to a pixel usable with limitations, in dependence on at least the associated defect class of the pixel and on pixel signals of a plurality of adjacent pixels, as to whether the generated pixel signal of the pixel should be corrected, with the generated pixel signal of the pixel being replaced by a replacement value if this is the case.

In this method, the decision on how a respective pixel is treated is therefore not already simple predefined by the defect characteristic of the pixel. At least when the pixel can be used with limitations, that is when a corresponding defect class is associated with it, a supplementary decision process takes place before the actual correction of the pixel. If, in contrast, the respective pixel is unusable or is usable without limitations, the decision on how the pixel is to be treated can already be fixed in advance. For example, the pixel signals of unusable pixels can always be discarded and can be replaced by respective replacement values; the pixel signals of pixels which can be used without limitation preferably do not require any correction.

An advance decision process is at least carried out for all other pixels. It is determined by this whether the generated pixel signal of the pixel should be corrected or not. The decision process comprises at least the taking into account of a twofold dependence: on the one hand, on the associated defect class of the respective pixel and, on the other hand, on pixel signals of a plurality of pixels adjacent to the respective pixel. The method in accordance with the invention can advantageously actually use this twofold dependence such that only those pixels are corrected in which the replacement of the generated pixel signal by a replacement value results in an improvement of the image quality. Due to the dependence of the named determination on the environment of a respective pixel, it in particular becomes possible that some of the pixels which are associated with a common defect class are corrected on the basis of a specific environment, but others are in contrast not corrected on the basis of a different specific environment. For example, some pixels can be defective to the extent that they have an increased dark current, i.e. that, on a low action of light or an absent action of light, they generate too large a pixel signal for this light action. In accordance with this method, such pixels are not simply generally ignored and replaced, but rather, for example, only in dark image regions where the difference caused by these pixels is particularly perceptible. Furthermore, for example, pixels whose defect is based on a low maximum sensitivity can only be corrected when the brightness of the environment is so high that their smaller sensitivity capability would result in a difference perceptible in the image signal.

The replacement of the generated pixel signals of the pixels for which it was determined that they should be replaced does not necessarily have to take place immediately after the determination on the correction of the pixel. The respective determined replacements are preferably only carried out after the determination on the correction has been completed for all pixels of the image sensor. In this case, originally produced pixel signals, and not already corrected pixel signals, are always taken into account for the determination of whether the generated pixel signal of the pixel is to be corrected.

The defect class associated with the respective pixel represents information on a substantially invariable property of the pixel. The method can admittedly also comprise steps for determining the defect characteristic and the defect characteristic can, as will still be explained in the following, be dependent on an operating mode of the image sensor. However, the defect characteristic and the defect class associated with the respective pixel are at least fixed before the carrying out of the named method steps for the correction of defective pixels. The pixel signals of the adjacent pixels are variable, in contrast. A respective new determination as to whether a correction should take place must therefore be made for each pixel of each individual image which can be used with limitations. The additional effort of the advance decision process which is associated with this is, however, compensated at least in part in that, as a consequence of the decision process, all unusable pixels and all pixels usable with limitations no longer have to be corrected, but as a rule a substantially smaller number. A complex determination of a replacement value can in particular be omitted for the pixels which are usable with limitations and for which it was found that they should not be corrected so that the efficiency of the method can be improved overall. It is furthermore advantageous that the pixel signals of the pixels usable with limitations can be used at least in part. The amount of the information taken into account overall by the image sensor thereby increases, which can result in a higher image quality.

The defect characteristic of at least the pixels which are usable with limitations comprises a defect class corresponding to the respective pixel. The information that a pixel is unusable and/or the information that a pixel can be used without limitations does not have to be present separately, but can also only be indirectly contained in the defect characteristic, namely by awarding a respective corresponding defect class.

A defect class characterizes the behavior of the pixel in dependence on further parameters such as the intensity and duration of the exposure in accordance with a predefined classification scheme. The categorization into the defect classes can in this respect take place in accordance with a gradation. A fine gradation allows a detailed taking into account of different degrees of usability of a respective pixel. At the same time, a reduction in the required calculation effort is achieved by the discrete values of the gradation with respect to a taking into account of continuous values. It can in particular be made possible by this that the method in accordance with the invention can also be used directly in a camera, which is preferably the case.

On the classification of the defective pixels, different types of defects can be distinguished which can also be present in combination in a respective pixel. For example a plurality of defect classes for each defect type can be associated with a pixel. Alternatively, only one defect class can be associated with the pixel, the defect class corresponding to a combination of the defects of different kinds for the respective pixel. Different types of defect can thus be taken into account independently of one another in the defect characteristic with a small calculation effort.

Depending on the type of defect, the respective classification scheme can be gradated differently, with differences with respect to the fineness or the kind of gradation being conceivable. For example, the defect classes for a dark current can thus have a linear gradation while the defect classes for nose in the dark can have a logarithmic gradation, for example with an increase of 15% from grade to grade.

The replacement value is preferably estimated in dependence on at least pixel signals of a set of adjacent pixels, in particular by interpolation. Thus, not only the determination of whether the generated pixel signal of a respective signal should be corrected is dependent on the environment of the pixel, but also the replacement value with which this pixel signal should be replaced. This double taking into account of the environment of the pixel allows a particularly individual correction of defective pixels.

In an embodiment, the named set of adjacent pixels which is used for the estimation of the replacement value is identical with the named plurality of adjacent pixels which are taken into account for the determination of whether a pixel signal should be corrected. However, the named set of adjacent pixels and the named plurality of adjacent pixels do not necessarily have to be the same adjacent pixels. In an alternative embodiment, the named plurality of adjacent pixels and the named set of adjacent pixels are different.

For example, the adjacent pixels used for the determination of whether a correction is carried out can preferably be selected with respect to the fact that a particularly good determination can be made with reference to them as to whether the differing pixel signal of a defective pixel in this environment is of any significance at all and is consequently in need of correction. The set of the adjacent pixels used for the estimation of the replacement value can in contrast be selected particularly suitably with reference to the fact that the estimation of the replacement value leads to high-quality results.

The respective pixel signals of a plurality of adjacent pixels can be the pixel signals actually generated by the adjacent pixels both in connection with the determination of whether a respective pixel should be corrected and in connection with the estimation of the respective replacement value. Provided that the adjacent pixels also include defective pixels which have already been corrected, these pixels can alternatively also be pixel signals already previously corrected.

In a further embodiment, the replacement value can be estimated at least in part in that the generated pixel signal of the pixel is modified in accordance with the defect characteristic of the pixel, i.e. in dependence on the associated defect class. The replacement value can therefore at least also be based in part on the originally produced pixel signal of the pixel usable with limitations. The originally generated pixel signal of the pixel is thus not discarded, but rather contributes to the replacement value with which it is replaced. This is in particular useful when the difference of the pixel signal generated by the defective pixel can be substantially compensated with respect to a pixel signal which would have generated a pixel which can be used without limitation. The compensation can, for example, takes place in a multiplicative manner by means of a correction factor or by using a specifically adapted mathematical function, with the defect characteristic in particular being able to be used for the selection of the suitable modification. The originally generated pixel signal of a pixel which can be used with limitations preferably only enters into the replacement value in a modified manner when the difference in the pixel signal can be compensated and is otherwise discarded. Whether the different in the pixel signal can be compensated can preferably be determined with reference to the defect characteristic of the pixel.

It is furthermore possible that the estimation of the replacement value takes place both in dependence on pixel signals of the named set of adjacent pixels and while taking account of the originally generated pixel signal of the defective pixel. This can take place, for example, by a weighted link of a value interpolated from the pixel signals of the adjacent pixels with the pixel signal of the defective pixel modified by means of a correction factor.

In an advantageous embodiment, the following steps are carried out for the determination of whether the generated pixel signal of the pixel should be corrected: determining an interpolation error of the pixel in dependence on at least the named pixel signals of the plurality of adjacent pixels; determining an error comparison value of the pixel in dependence on at least the associated defect class of the pixel; and comparing the interpolation error with the error comparison value. In this embodiment, a determination is only made that the generated pixel signal of the pixel should be corrected when the interpolation error is smaller or at least not larger than the error comparison value.

In this case, the decision on whether the generated pixel signal of a pixel should be corrected is therefore based on the comparison with an interpolation error of an error which is present due to the defect of the pixel and which can be derived as the error comparison value from the associated defect class of the pixel. The interpolation error preferably corresponds to the error which would be present after a correction of the pixel signal just due to the imperfection of this correction, that is, for instance, due to the uncertainty of an interpolation. A determination can thus be made with reference to the comparison of the error comparison vale with the interpolation error whether a replacement of the pixel signal of the respective pixel with the replacement value results in a reduction of the difference in the pixel signal of this pixel at all and therefore means an improvement of the image quality. The pixel signal of the pixel is advantageously only actually corrected when this is the case, that is when the interpolation error is smaller than the error comparison value.

Provision can in particular be made for the further increase of the efficiency that a determination that the generated pixel signal of the pixel should be corrected is only made when the interpolation error is smaller than the error comparison value by at least a specific comparison threshold. The larger this comparison threshold is selected, the fewer defective pixels for which a determination is made that the respective generated pixel signal should be corrected and the smaller the total effort of the correction. The smaller the comparison threshold is, the more comprehensive the correction is and the better the image quality therefore is. The respective prioritization of these contrary goals can be set by a suitable selection of the comparison threshold. The comparison threshold preferably has the smallest possible value at which the effort of the method still allows its application within a camera.

The dependence in accordance with the invention of the determination of whether a correction should take place on pixel signals of a plurality of adjacent pixels substantially enters into the decision via the named interpolation error. The interpolation error can be considered as a characteristic of how well the replacement value in all likelihood corresponds to or is similar to a value which a pixel which can be used without limitation would have produced as a pixel signal at this point. For the evaluation of this question, the pixel signals of the plurality of adjacent pixels are taken into account in the determination of the interpolation error, that is the environment of the pixel into which a suitable replacement value should be inserted in a manner as unobtrusive as possible.

As shown, the estimation of the replacement value can in particular take place by interpolation of pixel signals of a set of adjacent pixels. The determination of the interpolation error can preferably take place in dependence on pixel signals of the same adjacent pixels. It is, however, also possible that the pixel signals of a plurality of other adjacent pixels, e.g. of only some of the named set and/or fully different adjacent pixels, are used. For example, since fewer adjacent pixels are taken into account for the determination of the interpolation error than for the estimation of the replacement value, the efficiency of the determination of whether the generated pixel signal of a pixel should be corrected can be increased. For the correction carried out if this is the case, in contrast, a comparatively large number of adjacent pixels can be taken into account to achieve a quality of the estimation of the replacement value which is as high as possible. In such an embodiment of the method, the interpolation error admittedly does not necessarily reproduce the actual error of the replacement value, but it can nevertheless be considered in comparison with the error comparison value as an indication for whether the correction of the generated pixel signal has an advantageous effect on the image quality.

The determination of an interpolation of the pixel preferably comprises: interpolation noise being determined; noise of the plurality of adjacent pixels being determined, in particular in dependence on at least the respective associated defect classes of the plurality of adjacent pixels; and the interpolation error being determined in dependence on at least the interpolation noise and the noise of the plurality of adjacent pixels. The interpolation error can therefore substantially be composed of at least two error sources: interpolation noise, on the one hand, and noise of the adjacent pixels, on the other hand. In this respect, interpolation noise is to be understood as that error which is inherent in the respective method of the estimation of the replacement value. For an estimation always suffers from a specific uncertainty whose magnitude is in particular dependent on the method used, e.g. on a respective interpolation process. The interpolation noise, which represents a measure for this uncertainty, can be an absolute value or a relative value. For example, the interpolation noise can amount to 10% of a new value for the pixel signal of the pixel determined by a specific interpolation process. This new value preferably agrees with the replacement value, but can also differ from it.

However, not only an error caused by the estimation enters into the interpolation error, but it is rather additionally caused by errors in the pixel signals of the adjacent pixels. These errors are here called noise in combination and can advantageously be derived from the defect characteristic associated with the image sensor for the adjacent pixels. The noise of the plurality of adjacent pixels can then result from a common taking into account of the individual errors in the pixel signals of the adjacent pixels, for example in that a weighted sum or a functional value is formed which is suitably adapted to the interpolation process in another manner. Once the interpolation noise and the noise of the plurality of adjacent pixels are determined, the interpolation error can be determined in dependence on these values, for example as their sum or as a root of the sum of the squares.

The error comparison value is a measure for the difference in the pixel signal of the pixel caused by the defect in said pixel. To increase the significance of the error comparison value, the error comparison value can depend on further values in addition to the dependency on the associated defect class of the pixel. The determination of the error comparison value of the pixel in particular additionally takes place in dependence on the generated pixel signal and/or in dependence on an exposure time of the pixel and/or in dependence on the pixel signals of the plurality of adjacent pixels. Depending on the type of the defect of a pixel, the difference in the pixel signal of this pixel does not have to be constant, but can rather in particular depend on the generated pixel signal and on the exposure time of the pixel. How disturbing a perceivable defect a difference in the pixel signal of a defective pixel has furthermore depends on the environment of the pixel. Certain defects are particularly perceivable as disturbing in bright image regions, others particularly in dark image regions. It is therefore advantageous to take account of these dependencies in the determination of the error comparison value of the pixel in order thus to be able better to determine, with reference to the comparison with the interpolation error, whether a correction is useful in the sense of a perceivable improvement of the image quality.

To be able to take account of a plurality of different defect types which can also be present in combination in a respective pixel, the defect characteristic can preferably comprise information for each pixel with respect to at least two different defect types as to whether the pixel corresponds to one of a plurality of predefined respective defect classes. Different ways are possible as to how the different defect types can enter into the determination of whether the generated pixel signal of a respective pixel should be corrected.

In an embodiment, a common error comparison value of the pixel is determined for all different defect types in dependence on at least the associated defect class of the pixel and it is only determined that the generated pixel signal of the pixel should be corrected when the interpolation error is smaller or at least not larger than the common error comparison value. In this embodiment, a single defect class can in particular be associated with the pixel, said defect class representing the combination of the respective degrees of the defects of different types for this pixel. The categorization into defect classes can then take place, for example, in accordance with a multidimensional matrix, with each dimension corresponding to a defect type and with the dimensions being able to be gradated differently independently of one another (for example in a linear or logarithmic manner). A single error comparison value which thus takes account of all defect types together can thus be derived from the defect class associated with the pixel and this defect comparison value can then be compared with the interpolation error. All defect types consequently equally enter into the decision based on this comparison via the correction of the pixel.

In an alternative embodiment, a respective error comparison value of the pixel is determined for each of the different defect types in dependence on at least the respective associated defect class of the pixel and it is only determined that the generated pixel signal of the pixel should be corrected when the interpolation error is smaller or at least not larger than the respective error comparison value for at least one of the different defect types. In this alternative embodiment, a respective defect class can be associated with a respective pixel for each of the different defect types. A respective error comparison value of the pixel can thus also be derived for each of the different defect types from the corresponding defect class of the pixel. The interpolation error is then compared with all the error comparison values of the pixel, with the comparison being able to be aborted as soon as the interpolation error is smaller than one of the error comparison values. A determination that the generated pixel signal of a pixel should be corrected therefore only takes place when the interpolation error of the pixel is at least smaller than the maximum one of the error comparison values of the pixel. In this manner, only the respective dominant defect type with this pixel is decisive for the named determination on the correction of the pixel.

The different named defect types can in particular be increased noise in the dark, a small maximum sensitivity, a dark current and/or a difference with a short exposure time of the respective pixel. Increased noise in the dark means that the fluctuations in the pixel signal which are always present despite a constant exposure are highly increased at a low exposure intensity. The defect that the threshold is lowered from which onward an increase of the exposure intensity no longer results in an increase of the pixel signal is called the low maximum signal input. A pixel signal is called dark current which occurs at a low exposure of the pixel and represents an exposure higher than the actual exposure in the event of a defect. If the relationship between the pixel signal and the exposure time differs from the normal relationship at a short exposure time, this represents a further defect.

In an embodiment of the method, the plurality of adjacent pixels comprise pixels adjacent directly horizontally, directly vertically and/or directly diagonally relative to the pixel and/or indirectly adjacent pixels. This applies independently of one another both to the named plurality of adjacent pixels which are taken into account in the determination on the correction of the pixel signal of a pixel and to the set of adjacent pixels which can be used for estimating the replacement value. Directly adjacent pixels are pixels between which no further pixels are arranged on the image sensor, whereas with indirectly adjacent pixels some few other pixels can be arranged therebetween.

If the image sensor comprises at least a plurality of pixels which have a first color and a plurality of pixels which have a second color, an embodiment can be advantageous in which the pixel and the taken into account adjacent pixels of this pixel have the same color. In this embodiment therefore only those pixels which have the same color as the pixel are used as the named plurality of adjacent pixels or as the named set of adjacent pixels for the determination of whether the pixel signal of a pixel should be corrected and/or for the estimation of the replacement value with which the pixel is replaced if this is the case. Since pixels of the same color have a higher correlation to one another as a rule, this correlation can be used in this manner to improve the quality of the correction. The image sensor can in particular have pixels of three different colors which are arranged in accordance with the scheme of a color mosaic filter, preferably of a Bayer filter. If only those pixels are used as adjacent pixels which have the same color as the respective pixel, two pixels count as directly adjacent if no other pixel of the same color is arranged between them and they count as indirectly adjacent if only some few other pixels of the same color are arranged between them.

The method furthermore preferably comprises the defect characteristic for each pixel associated with the image sensor being determined for each pixel before a generation of the pixel signals and being stored in a memory device and the defect characteristic being read out of the memory device for each pixel before the determination of whether the generated pixel signal of the pixel should be corrected. The determination and storing of the defect characteristic is not necessarily part of the method for correcting defective pixels. For it is generally sufficient for the carrying out of the method if a defect characteristic associated with the image sensor is predefined in some manner. However, to determine this defect characteristic at all, a calibration can be carried out before the actual correction method by which the defect characteristic for every pixel is determined and is stored in a memory device for a later use. The memory device can in particular be contained in a camera comprising the image sensor. From there, the defect characteristic can then be read out of the memory device for the determination of whether the generated pixel signal of a signal should be corrected.

The determination and storage of the defect characteristic does not have to be carried out directly before the carrying out of the remaining method for correcting defective pixels. The determination and storage of the defect characteristic for an image sensor can in particular be carried out only once by the manufacturer of the image sensor or of a camera comprising the image sensor after the production of the image sensor or of the camera, whereas the further steps of the method, which comprise the actual correction, can take place a multiple of times. Alternatively or additionally to this, the determination and storage of the defect characteristic can also take place repeatedly, for example regularly in the sense of a servicing or postcalibration. In this manner, defects of pixels possibly only occurring in the course of time can be detected in the defect characteristic.

The defect characteristic can be stored in very different manners in the memory device. For example, the defect classes associated with the respective pixels can be stored as one or more bits, with pixels which are unusable or which can be used without limitations being able to be encoded by the same bits. In the last-named case, the information on a pixel being unusable or being usable without limitations ultimately also represents its own defect class.

In a further embodiment, the named determination of the defect characteristic comprises respective calibration data for each pixel being determined and being stored in a first memory of the memory device and the defect characteristic for each pixel associated with the image sensor being determined from the respective calibration data in dependence on an operating mode of the image sensor and being stored in a second memory of the memory device. In this embodiment, no defect characteristic is therefore initially directly associated with a respective pixel, but rather instead a set of respective calibration data. Such calibration data can in particular be determined for a respective pixel with respect to a plurality of different calibration parameters, for example within the framework of a calibration after the production of the image sensor or of a camera comprising the image sensor. In this respect, the different calibration parameters can, for example, correspond to different defect types and/or different operating modes. However, a plurality of calibration parameters on an individual defect type and/or on an individual operating mode can also be taken into account.

The calibration data determined for a respective pixel are stored in a first memory of the memory device from where they can be read out so that a defect characteristic to be associated with the respective pixel can be determined from these calibration data. The determination of the defect characteristic additionally takes place in this respect in dependence on an operating mode of the image sensor. The operating mode can, for example, be an exposure time or a temperature of the image sensor. However, other operating modes of the image sensor or of a camera comprising the image sensor can also be considered, e.g. a set sensitivity value.

Since initially only the calibration data are stored and in addition the operating mode of the image sensor is taken into account in the determination of the defect characteristic, the defect characteristic for different operating modes can be different and can thus be adapted particularly individually to different demands in the respective operating mode. The defect characteristic admittedly has to be determined again for this purpose on a change of the operating mode or on at least a first setting of the operating mode from the calibration data. Since, however, in this respect, no complete calibration takes place, but rather only the calibration data already present in the first memory are evaluated in dependence on the operating mode, this can be carried out fast and with a low effort.

Subsequently, the defect characteristic can be stored in the second memory of the memory device and can be read out from there for determining whether the generated pixel signal of a respective pixel should be corrected, at least as long as the operating mode is maintained. In the second memory, however, a plurality of respective defect characteristics can also be stored for different operating modes and a selection can then be made between the defect characteristics in dependence on the operating mode.

The named memory device can be configured as an individual memory element which comprises both the named first memory for the calibration data and the named second memory for the defect characteristic; it can, however, also have different memory elements, in particular separate memory elements, so that the first and second memories can be present in different memory elements, also spatially separate memory elements.

The invention also relates to a digital camera, in particular to a motion picture camera, having an image sensor which has a plurality of pixels for generating respective exposure dependent pixel signals and having a correction device which is suitable to carry out a method of the above-explained kind for correcting defective pixels of the image sensor. The named memory device can in particular likewise be provided as a part of the camera.

BRIEF DESCRIPTION OF THE DRAWINGS

The invention will be explained in the following only by way of example with reference to the drawings.

DETAILED DESCRIPTION OF THE PREFERRED EMBODIMENTS

Figure 1:
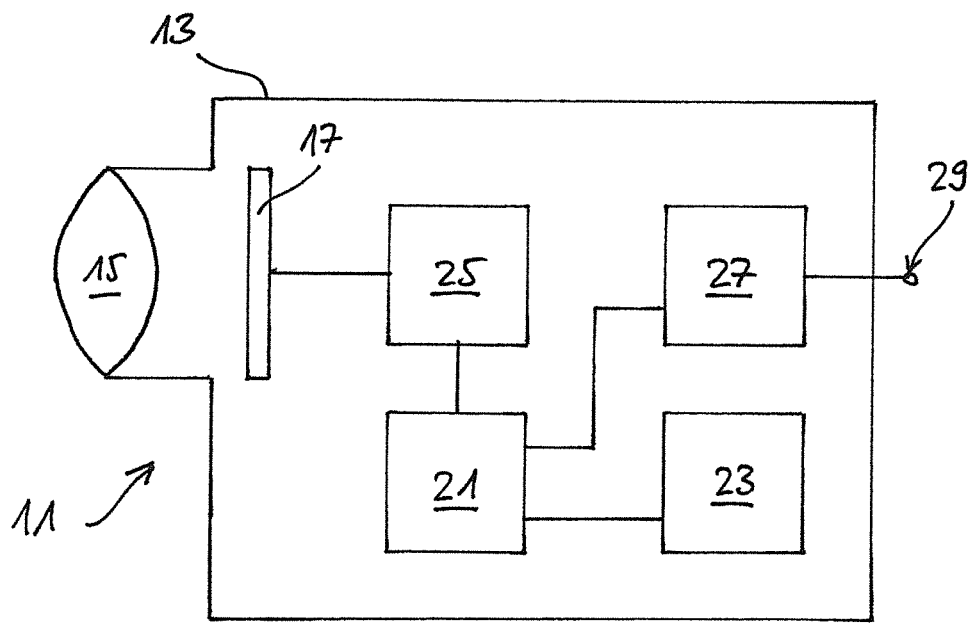
FIG. 1 shows a digital film camera in which a method in accordance with the invention can be carried out.

The camera 11 shown in simplified form in FIG. 1 comprises a housing 13 having an opening in which a lens 15 is arranged. Light of a scene to be taken which enters through the lens 15 into the camera 11 is imaged onto an image sensor 17.

Figure 2:
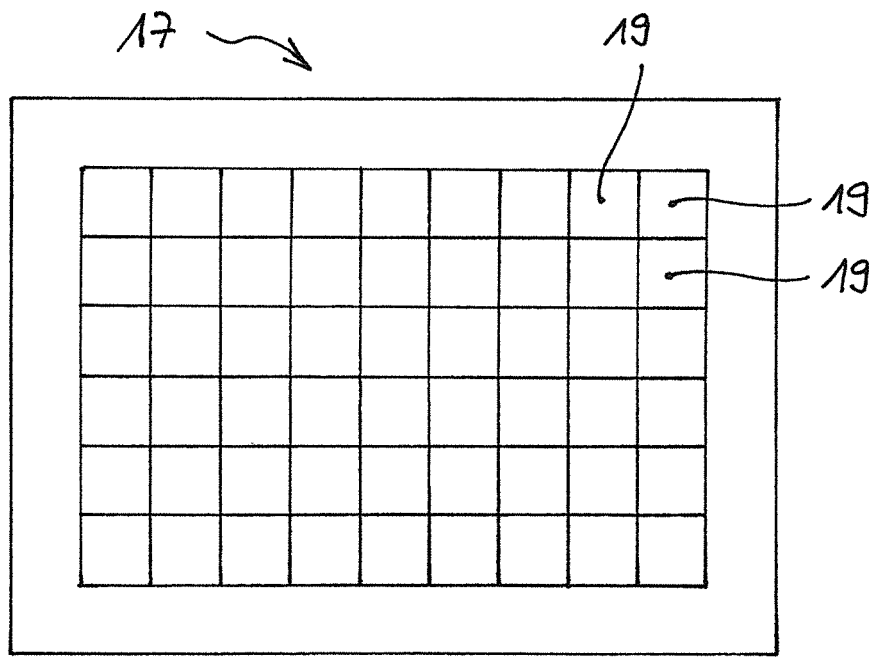
FIG. 2 shows an image sensor of the camera shown in FIG. 1.

The image sensor 17 is shown schematically in FIG. 2 and comprises a plurality of light-sensitive pixels 19 which are arranged in rows and columns on the image sensor 17. Overall, the image sensor 17 can have several million pixels 19, for example in an aspect ratio of 3:2 or 4:3. For reasons of simplification, only a few pixels 19 are shown. The image sensor 17 can in particular have a color mosaic filter, not shown, so that a respective pixel 19 is only acted on by light of a single one of the colors of the color mosaic filter such as red, green or blue, for instance.

The individual pixels 19 of the image sensor 17 generate pixel signals in dependence on the incident light which together form a respective image signal of an image. Provided that the camera 11 is a moving image camera (movie camera), a plurality of image signals are generated in a regular sequence, for example for 24, 25 or 30 images a second, or for a multiple thereof.

Due to manufacture-induced fluctuations, some of the pixels 19 of the image sector 17 can be defective, i.e. cannot be used without limitations. Defective pixels can in this respect either be fully unusable or, however, at least usable with limitations.

As shown in FIG. 1, the camera 11 comprises, in addition to the image sensor 17, a correction device 21 having a memory device 23 for a defect characteristic of the image sensor 17, an optional buffer memory 25 for buffering pixel signals as well as an image memory 27 for storing image signals. The correction device 21 is in this respect configured for carrying out the method explained in detail above for correcting defective pixels 19 of the image sensor 17. The correction device 21 can receive the respective pixels directly from the image sensor 17, for example, and can forward them in corrected form or can read them out of the image memory 27, correct them and write them back or—as shown in FIG. 1—can receive them from the buffer memory 25 and can write them into the image memory 27 in corrected form.

The buffer memory 25 can in particular serve to collect respective pixel signals until a complete image signal is present with pixel signals of all pixels 19 of the image sensor 17. The buffer memory 25 can, however, also collect more than one complete image signal or only parts of a complete image signal. The pixel signals buffered in this manner can then be output to the correction device 21.

When the correction device 21 receives pixel signals, it can in particular carry out the following steps for correcting the defective pixels 19 of the image sensor 17:

The correction device 21 first checks whether a respective pixel corresponds to an unusable pixel or to a pixel which can be used without limitations. The correction device 21 can read out the information on the pixel required for this purpose from the memory device 23 to which it is connected and in which a defect characteristic associated with the image sensor 17 is stored with corresponding information for each pixel 19 of the image sensor 17.

If the respective pixel 19 is unusable, the correction device 21 can determine a replacement value for the pixel signal of this pixel 19 directly (e.g. by interpolation) and can output it as a new pixel signal of this pixel 19. If the respective pixel 19 can be used without limitations, the pixel signal of the pixel 19 can remain unchanged. If, however, the respective pixel 19 is neither unusable nor usable without limitations, the correction device 21 makes a determination in dependence on the defect class associated with the pixel 19 and on pixel signals of a plurality of adjacent pixels 19 (and optionally in dependence on further parameters) whether the generated pixel signal of the pixel 19 should be corrected or not. The correction device 21 can in turn take the named defect class associated with the pixel 19 from the information stored in the memory device 23.

If the named determination has the result that the pixel signal of the respective signal 19 should be corrected, the correction device 21 then replaces the pixel signal of the pixel 19 with a replacement value which can in particular be determined by the correction device 21 itself. Provision can otherwise be made that the pixel signal of the pixel 19 is not replaced, but rather remains unchanged.

To carry out these steps, the correction device 21 can, for example, comprise a microprocessor, with the steps of the method then being able to be stored as programmed instructions for the microprocessor in the correction device 21.

Finally, the corrected image signals, i.e. the image signals on whose pixel signals the explained method for correcting defective pixels 19 of the image sensor 17 has been applied, can be stored in the image memory 27 from where they can then be read out via an output 29 of the camera 11. An image memory 27 does not, however, necessarily have to be provided in the camera 11. Alternatively, the corrected image signals can also be output directly at the output 29 of the camera 11.

The invention claimed is:

1. A method for correcting defective pixels (19) of an image sensor (17), the image sensor having a plurality of pixels (19) for generating respective exposure dependent pixel signals, wherein for each pixel (10) a respective defect characteristic is associated with the image sensor (17) and comprises information on at least whether the pixel (19) is unusable, can be used without requiring correction or corresponds to one of a plurality of predefined defect classes, wherein the method comprises the steps of:
after the generation of the pixel signals:
at least for each pixel (19) whose respective defect characteristic does not correspond to an unusable pixel (19) or to a pixel (19) which can be used without requiring correction, making a determination of whether the generated pixel signal of the pixel (19) should be corrected, wherein the determination depends on at least the corresponding defect class of the pixel (19) and on pixel signals of a plurality of adjacent pixels (19); and
replacing the generated pixel signal of the pixel (19) with a replacement value if the making the determination yields the result that the generated pixel signal of the pixel (19) should be corrected;
wherein the making the determination comprises the steps of:
determining an interpolation error of the pixel (19) in dependence on at least the pixel signals of the plurality of adjacent pixels (19);
determining an error comparison value of the pixel (19) in dependence on at least the corresponding defect class of the pixel (19); and
comparing the interpolation error with the error comparison value;

wherein the making the determination yields the result that the generated pixel signal of the pixel (19) should be corrected, only if the interpolation error is smaller than the error comparison value.

2. The method in accordance with claim 1, wherein the replacement value is estimated in dependence on at least pixel signals of a set of adjacent pixels (19).

3. The method in accordance with claim 1, wherein the replacement value is estimated at least in part in that the generated pixel signal of the pixel (19) is modified in accordance with the respective defect characteristic of the pixel (19).

4. The method in accordance with claim 1, wherein the determination of the interpolation error of the pixel (19) comprises the steps of:
determining interpolation noise;
determining noise of the plurality of adjacent pixels (19); and
determining the interpolation error in dependence on at least the interpolation noise and the noise of the plurality of adjacent pixels (19).

5. The method in accordance with claim 4, wherein the step of determining noise of the plurality of adjacent pixels (19) is carried out in dependence on at least the respective defect classes of the plurality of adjacent pixels (19).

6. The method in accordance with claim 1, wherein the determination of the error comparison value of the pixel (19) additionally takes place in dependence on at least one of the following members selected from the group comprising: the generated pixel signal of the pixel (19), an exposure time of the pixel (19) and the pixel signals of the plurality of adjacent pixels (19).

7. The method in accordance with claim 1, wherein the respective defect characteristic for each pixel (19) comprises information with respect to at least two different defect types on whether the pixel (19) corresponds to one of a plurality of predefined respective defect classes;
wherein a common error comparison value of the pixel (19) is determined for all different defect types in dependence on at least the corresponding defect class of the pixel (19); and
wherein a determination is only made that the generated pixel signal of the pixel (19) should be corrected if the interpolation error is smaller than the common error comparison value.

8. The method in accordance with claim 1, wherein the respective defect characteristic for each pixel (19) comprises information with respect to at least two different defect types on whether the pixel (19) corresponds to one of a plurality of predefined respective defect classes;
wherein a respective error comparison value of the pixel (19) is determined for each of the different defect types in dependence on at least the corresponding defect class of the pixel (19); and
wherein a determination is only made that the generated pixel signal of the pixel (19) should be corrected if the interpolation error for at least one of the different defect types is smaller than the respective error comparison value.

9. The method in accordance with claim 7, wherein the different defect types comprise at least one of the following members selected from the group comprising increased noise in the dark, a low maximum sensitivity, a dark current and a difference with a short exposure time of the respective pixel (19).

10. The method in accordance with claim 1, wherein the plurality of adjacent pixels (19) comprise at least one of the following members selected from the group comprising: pixels (19) adjacent directly horizontally relative to the pixel (19), pixels (19) adjacent directly vertically relative to the pixel (19), pixels (19) adjacent directly diagonally relative to the pixel (19) and indirectly adjacent pixels (19).

11. The method in accordance with claim 1, wherein the image sensor (17) comprises at least a plurality of pixels (19) which have a first color and a plurality of pixels (19) which have a second color; and
wherein the pixel (19) and a plurality of adjacent pixels (19) have the same color.

12. A method for correcting defective pixels (19) of an image sensor (17), the image sensor having a plurality of pixels (19) for generating respective exposure dependent pixel signals, wherein for each pixel (19) a respective defect characteristic is associated with the image sensor (17) and comprises information on at least whether the pixel (19) is unusable, can be used without requiring correction or corresponds to one of a plurality of predefined defect classes,
wherein the method comprises the steps of:
before the generation of the pixel signals:
determining for each pixel (19) the respective defect characteristic associated with the image sensor (17) and storing the respective defect characteristic in a memory device (23);
before making a determination of whether the generated pixel signal of the pixel (19) should be corrected:
reading the respective defect characteristic out of the memory device (23);
after the generation of the pixel signals:
at least for each pixel (19) whose respective defect characteristic does not correspond to an unusable pixel (19) or to a pixel (19) which can be used without requiring correction, making a determination of whether the generated pixel signal of the pixel (19) should be corrected, wherein the determination depends on at least the corresponding defect class of the pixel (19) and on pixel signals of a plurality of adjacent pixels (19); and
replacing the generated pixel signal of the pixel (19) with a replacement value if the making the determination yields the result that the generated pixel signal of the pixel (19) should be corrected.

13. The method in accordance with claim 12, wherein the step of determining the respective defect characteristic comprises the steps of:
determining respective calibration data for each pixel (19) and storing the respective calibration data in a first memory of the memory device (23); and
determining the respective defect characteristic for each pixel (19) from the respective calibration data in dependence on an operating mode of the image sensor (17) and storing the operating mode dependent respective defect characteristic in a second memory of the memory device (23).

14. A digital camera (11) comprising:
an image sensor (17) which has a plurality of pixels (19) for generating respective exposure dependent pixel signals;
a memory device (23) in which for each pixel (19) a respective defect characteristic is stored which comprises information on at least whether the pixel (19) is unusable, can be used without requiring correction or corresponds to one of a plurality of predefined defect classes; and a correction device (21) which is adapted to carry out a method for correcting defective pixels (19) of the image sensor (17); the method comprising the steps of:
before making a determination of whether the generated pixel signal of the pixel (19) should be corrected:
reading the respective defect characteristic out of the memory device (23);
after the generation of the pixel signals:
at least for each pixel (19) whose respective defect characteristic does not correspond to an unusable pixel (19) or to a pixel (19) which can be used without requiring correction, making a determination of whether the generated pixel signal of the pixel (19) should be corrected, wherein the determination depends on at least the corresponding defect class of the pixel (19) and on pixel signals of a plurality of adjacent pixels (19); and
replacing the generated pixel signal of the pixel (19) with a replacement value if the determination yields the result that the generated pixel signal of the pixel (19) should be corrected.

15. The digital camera in accordance with claim 14, wherein the camera is a movie camera.

\* \* \* \* \*